US009594390B2

(12) United States Patent
Kundu et al.

(10) Patent No.: US 9,594,390 B2
(45) Date of Patent: Mar. 14, 2017

(54) VOLTAGE REFERENCE CIRCUIT

(71) Applicant: Taiwan Semiconductor Manufacturing Company Limited, Hsin-Chu (TW)

(72) Inventors: Amit Kundu, Hsinchu (TW); Jaw-Juinn Horng, Hsinchu (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 43 days.

(21) Appl. No.: 14/554,353

(22) Filed: Nov. 26, 2014

(65) Prior Publication Data

US 2016/0147245 A1 May 26, 2016

(51) Int. Cl.
*G06F 7/14* (2006.01)
*G05F 3/02* (2006.01)

(52) U.S. Cl.
CPC .................................... *G05F 3/02* (2013.01)

(58) Field of Classification Search
USPC .......................................................... 327/361
See application file for complete search history.

(56) References Cited

U.S. PATENT DOCUMENTS 4,504,747 A * 3/1985 Smith ............ H03K 19/017518 326/70
6,498,737 B1 12/2002 Kuo
6,661,713 B1 12/2003 Kuo
7,557,651 B2 * 7/2009 Corsi .................. H03F 3/45094 330/124 R
7,755,344 B2 7/2010 Hsieh
8,575,998 B2 11/2013 Huang et al.
8,587,368 B2 11/2013 Yao et al.
2010/0327842 A1 * 12/2010 Seok ....................... G05F 3/242 323/313
2012/0293212 A1 * 11/2012 Hanson .................. G11C 5/147 327/103

(Continued)

OTHER PUBLICATIONS

Lin, et al., "A Sub-1V Bandgap Reference Circuit Using Subthreshold Current", 2005, pp. 4253-4256, http://www.csie.ncue.edu.tw/csie/ic/seminar_new/9602/970505/970505_04.pdf.

(Continued)

*Primary Examiner* — Lincoln Donovan
*Assistant Examiner* — Patrick Chen
(74) *Attorney, Agent, or Firm* — Cooper Legal Group, LLC

(57) ABSTRACT

A voltage reference circuit is provided. In some embodiments, the voltage reference circuit includes a MOS stack that includes two or more MOS transistors having a substantially same voltage threshold. The voltage reference circuit is configured to generate, via the MOS stack, a first voltage waveform having a first temperature co-efficient and a second voltage waveform having a second temperature co-efficient. In some embodiments, the first temperature co-efficient has a polarity that is opposite a polarity of the second temperature co-efficient. In some embodiments, the first voltage waveform and the second voltage waveform are used to generate a reference voltage waveform, where the reference voltage waveform is substantially temperature independent due to the opposite polarities of the first temperature co-efficient and the second temperature co-efficient.

20 Claims, 5 Drawing Sheets

(56) References Cited

U.S. PATENT DOCUMENTS

2014/0070873 A1 3/2014 Gunther et al.

OTHER PUBLICATIONS

Ueno, Ken, "CMOS Voltage and Current Reference Circuits consisting of Subthreshold MOSFETs—Micropower Circuit Components for Power-aware LSI Applications—", pp. 1-26, Source: Solid State Circuits Technologies, Book edited by: Jacobus W. Swart, ISBN 978-953-307-045-2, pp. 462, Jan. 2010, INTECH, Croatia, downloaded from sciyo.com, http://cdn.intechweb.org/pdfs/6487.pdf.

Zhang, et al., "A Low-Voltage, Low-Power Subthreshold CMOS Voltage Reference without Resistors and High Threshold Voltage Devices", 2012, pp. 384-387.

A. Anvesha, et al., "A Sub-1V 32nA Process, Voltage and Temperature Invariant Voltage Reference Circuit", 2013, pp. 136-141, http://www.computer.org/csdl/proceedings/vlsid/2013/4889/00/4889a136-abs.html.

Magnelli, et al., "A 2.6 nW, 0.45 V Temperature-Compensated Subthreshold CMOS Voltage Reference", IEEE Journal of Solid-State Circuits, vol. 46, No. 2, Feb. 2011, pp. 465-474.

* cited by examiner

VOLTAGE REFERENCE CIRCUIT

BACKGROUND

Voltage reference circuits are used in analog and digital circuits to provide a stable, temperature-independent reference voltage. As the name suggests, a voltage generated by a voltage reference circuit is used as a reference for other circuits and is intended to remain fixed irrespective of the load on the voltage reference circuit and irrespective of power supply variations to the voltage reference circuit.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
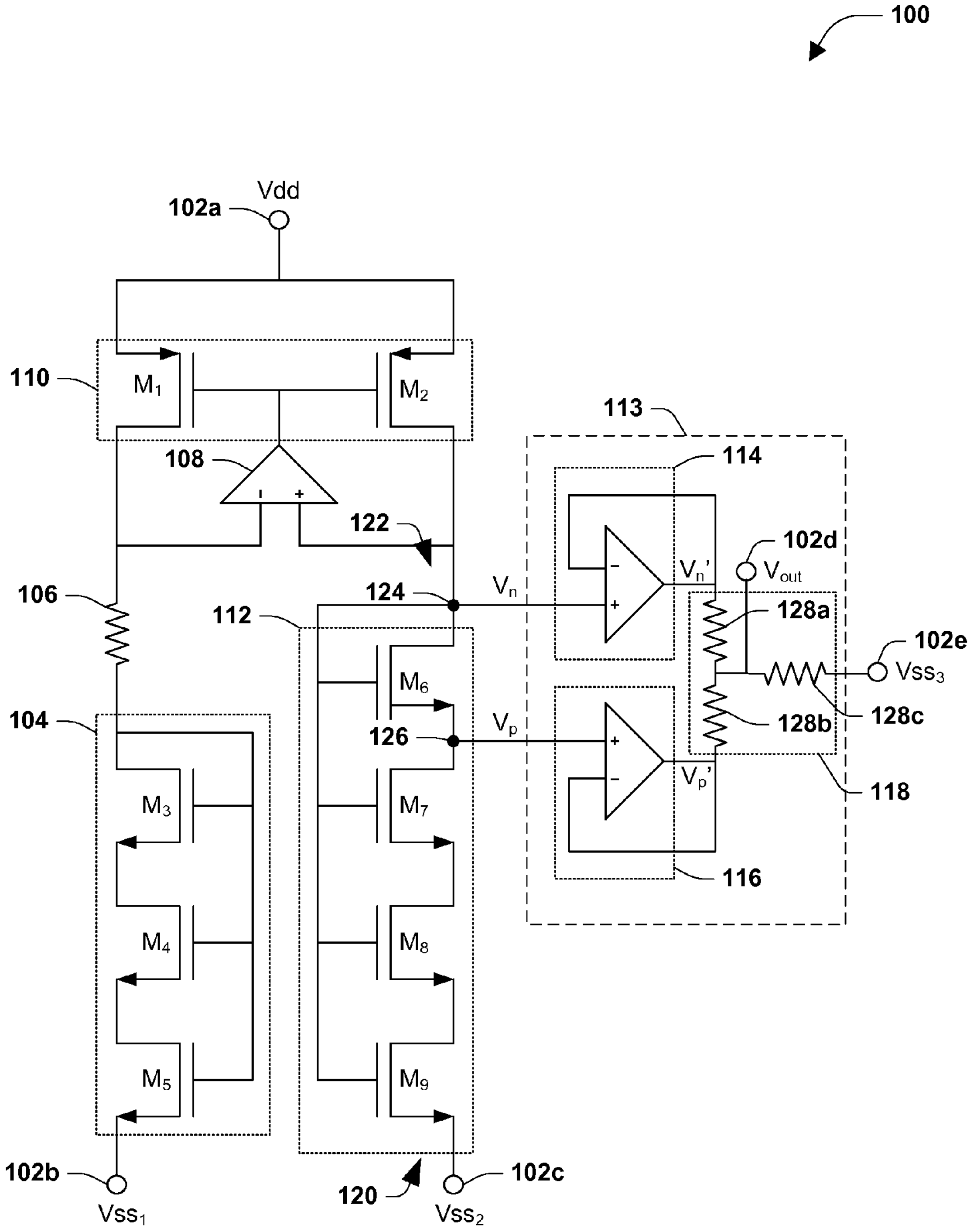
FIG. 1 is voltage-based implementation of a voltage reference circuit, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein, a voltage waveform having a negative temperature co-efficient refers to a voltage waveform having a voltage that decreases as a temperature in and around a circuit generating the voltage waveform increases, and a voltage waveform having a positive temperature co-efficient refers to a voltage waveform having a voltage that increases as a temperature in and around a circuit generating the voltage waveform increases. Further, a current waveform having a negative temperature co-efficient refers to a current waveform having a current that decreases as a temperature in and around a circuit generating the current waveform increases, and a current waveform having a positive temperature co-efficient refers to a current waveform having a current that increases as a temperature in and around a circuit generating the voltage waveform increases.

According to some embodiments, a voltage reference circuit having a metal-oxide semiconductor (MOS) stack is provided. The MOS stack comprises two or more MOS transistors, such as MOS field-effect transistors (MOSFETs), etc., having a substantially same voltage threshold ($V_{th}$). Unless otherwise noted herein, transistors represented by a schematic element conventionally regarded as representing a p-channel transistor may be substituted with an n-channel transistor and transistors represented by a schematic element conventionally regarded as representing an n-channel transistor may be substituted with a p-channel transistor. Further, generating a voltage or a voltage waveform from a component is not intended to imply that the component is a source of the voltage or voltage waveform but rather that the voltage or voltage waveform is influenced by or a function of the component.

In some embodiments, the MOS stack is configured to generate, within the voltage reference circuit, a first voltage waveform ($V_n$) having a negative temperature co-efficient and a second voltage waveform ($V_p$) having a positive temperature co-efficient. In some embodiments, a ratio of channel widths of MOS transistors of the MOS stack is selected based upon a desired variation in a voltage of the first voltage waveform due to a change in temperature, a desired variation in a voltage of the second voltage waveform due to a change in temperature, or a desired relationship between a variation in the voltage of the first voltage waveform and a variation in the voltage of the second voltage waveform due to a change in temperature. In some embodiments, a ratio of the channel lengths of the MOS transistors of the MOS stack is selected based upon a desired variation in a voltage of the first voltage waveform due to a change in temperature, a desired variation in a voltage of the second voltage waveform due to a change in temperature, or a desired relationship between a variation in the voltage of the first voltage waveform and a variation in the voltage of the second voltage waveform due to a change in temperature.

Referring to FIG. 1, a voltage-based implementation of a voltage reference circuit 100 according to some embodiments is provided. The voltage reference circuit 100 comprises five terminals 102*a-e*. A first terminal 102*a* is coupled to a first source Vdd, a second terminal 102*b* is coupled to a second source $Vss_1$, a third terminal 102*c* is coupled to a third source $Vss_2$, a fourth terminal 102*d* is coupled to a load of the voltage reference circuit 100, and a fifth terminals 102*e* is coupled to a fourth source $Vss_3$. In some embodiments, the second source $Vss_1$, the third source $Vss_2$, and the fourth source $Vss_3$ are a same source. In some embodiments, at least one of the second source $Vss_1$, the third source $Vss_2$, or the fourth source $Vss_3$ is ground. A reference voltage waveform is output from the fourth terminal 102*d*. In some embodiments, the reference voltage waveform is used as a reference for other circuits of a device.

Starting from the bottom left of FIG. 1 and moving clockwise, the voltage reference circuit 100 comprises a first MOS stack 104, a resistor 106, an operational amplifier (op-amp) 108, a pair of MOS transistors 110, and a second MOS stack 112. The voltage reference circuit 100 further comprises a summation circuit 113. In some embodiments, the summation circuit 113 comprises a first buffer 114, a second buffer 116, and a resistive summer 118.

The first source Vdd is coupled to the first terminal 102*a* and is configured to supply power to the voltage reference circuit 100. The pair of MOS transistors 110, the op-amp 108, the resistor 106, and the first MOS stack 104 are configured to operate in conjunction to maintain a substantially constant current through the second MOS stack 112 despite possible variations in a voltage applied to the first terminal 102*a* or in a current through the first terminal 102*a*.

A number of MOS transistors that comprise the first MOS stack 104 may be application specific and therefore the first MOS stack 104 is not intended to be limited to comprising three MOS transistors $M_3$-$M_5$ as illustrated in FIG. 1. For example, the first MOS stack 104 may comprise any number of MOS transistors.

Further, sizing requirements or operating parameters for the pair of MOS transistors 110, the op-amp 108, the resistor 106, and the first MOS stack 104 may be application specific based upon, among other things, a desired power rating of the voltage reference circuit 100. In some embodiments, the channel length of respective MOS transistors $M_3$-$M_5$ is substantially equal to a channel length of a first MOS transistor $M_6$ of the second MOS stack 112. In some embodiments, the channel width of respective MOS transistors $M_3$-$M_5$ is substantially equal to a channel width of the first MOS transistor $M_6$ of the second MOS stack 112. In some embodiments, the MOS transistors $M_3$-$M_5$ are configured to have a substantially same voltage threshold as the voltage threshold of MOS transistors $M_6$-$M_9$ of the second MOS stack 112.

The second MOS stack 112 is configured to generate a first voltage waveform $V_n$ and a second voltage waveform $V_p$ from the voltage applied to the first terminal 102*a*. The second MOS stack 112 may comprise any number of MOS transistors greater than 1. For example, in the illustrated embodiment, the second MOS stack 112 comprises four MOS transistors $M_6$-$M_9$, although the instant application is not intended to be limited to this embodiment.

For purposes of explanation, a bottom 120 of the second MOS stack 112 refers to a region of the second MOS stack 112 nearest the third terminal 102*c* and a top 122 of the second MOS stack 112 refers to a region of second MOS stack 112 nearest the first terminal 102*a*.

The first voltage waveform $V_n$ is applied to a first node 124, which is coupled to a first source/drain region of the first MOS transistor $M_6$ disposed nearest the top 122 of the MOS stack 112. The second voltage waveform $V_p$ is applied to a second node 126, which is coupled between a second source/drain region of the first MOS transistor $M_6$ and a first source/drain region of a second MOS transistor $M_7$. For example, where the MOS transistors $M_6$-$M_9$ correspond to n-channel MOS transistors, the first node 124 is coupled to a drain of the first MOS transistor $M_6$ and the second node 126 is coupled between a source of the first MOS transistor $M_6$ and a drain of the second MOS transistor $M_7$. Gates of respective MOS transistors $M_6$-$M_9$ are coupled to the first node 124, and thus the first voltage waveform $V_n$ is applied to the gates of respective MOS transistors $M_6$-$M_9$ of the second MOS stack 112.

In some embodiments, the MOS transistors $M_6$-$M_9$ have a substantially same threshold voltage, although the particular voltage threshold that is selected may be application specific and thus may vary by application. Further, in some embodiments, the MOS transistors $M_6$-$M_9$ are configured to operate in a sub-threshold region, where the sub-threshold region corresponds to a spectrum of voltages below the voltage threshold for the MOS transistors $M_6$-$M_9$.

In some embodiments, the first voltage waveform $V_n$ has a negative temperature co-efficient and is equal to a sum of the drain-to-source voltages ($V_{ds}$) of respective MOS transistors $M_6$-$M_9$ of the second MOS stack 112. In embodiments where the MOS transistors $M_6$-$M_9$ are n-channel MOS transistors, the $V_{ds}$ of the first MOS transistor $M_6$ is equal to the gate-to-source voltage ($V_{gs}$) of the first MOS transistor $M_6$, the $V_{ds}$ of the second MOS transistor $M_7$ is equal to a difference between $V_{gs}$ of the second MOS transistor $M_7$ and $V_{gs}$ of the first MOS transistor $M_6$, the $V_{ds}$ of a third MOS transistor $M_8$ is equal to a difference between $V_{gs}$ of the third MOS transistor $M_8$ and $V_{gs}$ of the second MOS transistor $M_7$, etc. In embodiments where the MOS transistors $M_6$-$M_9$ are p-channel MOS transistors, the $V_{ds}$ of the first MOS transistor $M_6$ is equal to the gate-to-drain voltage ($V_{gd}$) of the first MOS transistor $M_6$, the $V_{ds}$ of the second MOS transistor $M_7$ is equal to a difference between $V_{gd}$ of the second MOS transistor $M_7$ and $V_{gd}$ of the first MOS transistor $M_6$, the $V_{ds}$ of a third MOS transistor $M_8$ is equal to a difference between $V_{gd}$ of the third MOS transistor $M_8$ and $V_{gd}$ of the second MOS transistor $M_7$, etc.

In some embodiments, the second voltage waveform $V_p$ has a positive temperature co-efficient. In embodiments where the MOS transistors $M_6$-$M_9$ are n-channel MOS transistors, $V_p$ is equal to a difference between a $V_{gs}$ of the fourth MOS transistor $M_9$ nearest the bottom of the second MOS stack 112 and the $V_{gs}$ of the first MOS transistor $M_6$ nearest the top of the second MOS stack 112. In embodiments where the transistors $M_6$-$M_9$ are p-channel MOS transistors, $V_p$ is equal to a difference between a $V_{gd}$ of the MOS transistor $M_9$ nearest the bottom of the second MOS stack 112 and the $V_{gd}$ of the first MOS transistor $M_6$ nearest the top of the second MOS stack 112.

In some embodiments, the temperature co-efficients of the first voltage waveform $V_n$ and the second voltage waveform $V_p$ are reversed, and thus the first voltage waveform $V_n$ at the first node 124 has a positive temperature co-efficient and the second voltage waveform $V_p$ at the second node 126 has a negative temperature co-efficient.

When the threshold voltage of respective MOS transistors $M_6$-$M_9$ within the second MOS stack 112 are substantially equal, the threshold voltages cancel out when computing the difference between two gate-to-source voltages for n-channel MOS transistors and when computing the difference between two gate-to-drain voltages for p-channel MOS transistors. Accordingly, in some embodiments, the difference between gate-to-source voltages of two n-channel MOS transistors is a function of the difference, if any, in channel widths of the two MOS transistors and the difference, if any, in channel lengths of the two MOS transistors. In some embodiments, the difference between gate-to-drain voltages of two p-channel MOS transistors is a function of the difference, if any, in channel widths of the two MOS transistors and the difference, if any, in channel lengths of the two MOS transistors. Thus, in some embodiments, a ratio of the channel widths of MOS transistors of the second MOS stack 112 is selected based upon a desired slope of the first voltage waveform $V_n$ due to a temperature co-efficient of the first voltage waveform $V_n$, a desired slope of the second voltage waveform $V_p$ due to a temperature co-efficient of the second voltage waveform $V_p$, or a desired relationship between a slope of the first voltage waveform $V_n$ and a slope of the second voltage waveform $V_p$. In some embodiments, a ratio of the channel lengths of the MOS transistors of the second MOS stack 112 is selected based upon the desired slope of the first voltage waveform $V_n$ due to a temperature co-efficient of the first voltage waveform $V_n$, the desired slope of the second voltage waveform $V_p$ due to a temperature co-efficient of the second voltage waveform $V_p$, or a desired relationship between a slope of the first voltage waveform $V_n$ and a slope of the second voltage waveform $V_p$ based upon a change in temperature.

Returning to FIG. 1, a summation circuit 113 is configured to merge the first voltage waveform $V_n$ with the second voltage waveform to generate a reference voltage waveform that is output through the fourth terminal 102*d*. In some embodiments, the first voltage waveform $V_n$ is applied to an input of the first buffer 114, such as a second op-amp, and the second voltage waveform $V_p$ is applied to an input of the second buffer 116, such as a third op-amp. Respective buffers 114, 116 form a feedback loop, where the output of respective buffers 114, 116 is fed back into a second input of respective buffers 114, 116. In some embodiments, the first buffer 114 is configured to smooth the first voltage waveform $V_n$ and the second buffer 116 is configured to smooth the second voltage waveform $V_p$ to reduce fluctuations in the first voltage waveform $V_n$ and the second voltage waveform $V_p$, respectively. The output of the first buffer 114 is referred to herein as a first buffered voltage waveform $V_n'$ and the output of the second voltage waveform 114 is referred to herein as a second buffered voltage waveform $V_p'$.

In some embodiments, the outputs of the first buffer 114 and the second buffer are applied to the resistive summer 118. The resistive summer 118 comprises a plurality of resistors 128, such as resistors 128*a-c*, and is configured to merge the first buffered voltage waveform $V_n'$ with the second buffered voltage waveform $V_p'$ to generate the reference voltage waveform, which is output at the fourth terminal 102*d*. In some embodiments, the resistors 128 have a t-shaped configuration, where respective resistors 128 are coupled to the fourth terminal 102*d*, thus creating a common node for the resistors 128 at the fourth terminals 102*d*.

In some embodiments, the resistive summer 118 is configured to merge the first buffered voltage waveform $V_n'$ with the second buffered voltage waveform $V_p'$ using a summation approach where a voltage of the first buffered voltage waveform $V_n'$ is summed with the second buffered voltage waveform $V_p'$. In some embodiments, the resistive summer 118 is configured to merge the first buffered voltage waveform $V_n'$ with the second buffered voltage waveform $V_p'$ using a weighted summation approach, where the first buffered voltage waveform $V_n'$ and the second buffered voltage waveform $V_p'$ are weighted prior to being summed. In some embodiments, a weight applied to the first buffered voltage waveform $V_n'$ is based upon a resistance associated with a first resistor 128*a* of the plurality of resistors and a weight applied to the second buffered voltage waveform $V_p'$ is based upon a resistance associated with a second resistor 128*b* of the plurality of resistors. In some embodiments, the weight applied to the first buffered voltage waveform $V_n'$ relative to the weight applied to the second buffered voltage waveform $V_p'$ is based upon a ratio of the resistance associated with the first resistor 128*a* and the resistance associated with the second resistor 128*b*.

Figure 2:
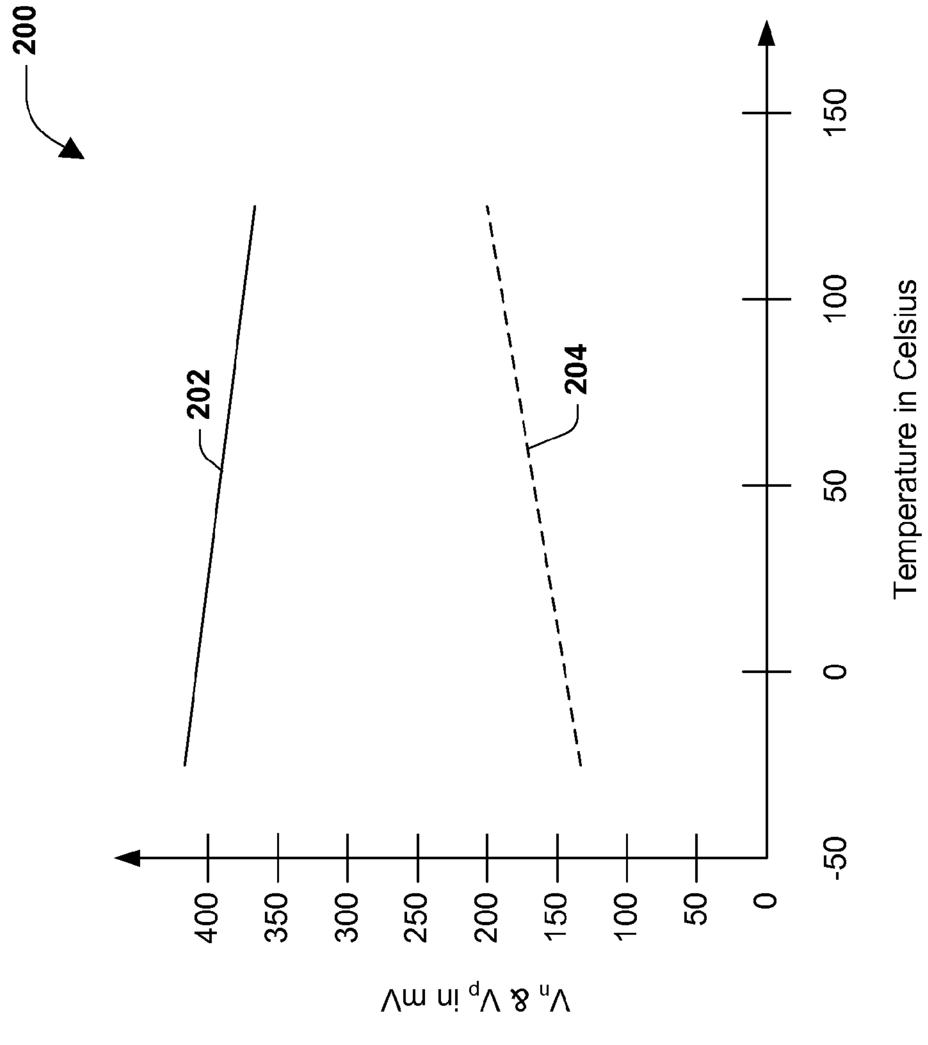
FIG. 2 is a graph illustrating voltage changes of a first voltage waveform and a second voltage waveform due to temperature, in accordance with some embodiments.

As will be further understood with respect to FIG. 2, when a change in temperature results in a non-equal degree of voltage change between the first buffered voltage waveform $V_n'$ and the second buffered voltage waveform $V_p'$ due to differences in temperature co-efficients, the weighted summation approach can be utilized to correct for this non-equal degree of change to reduce, possibly to zero, a temperature coefficient of the reference voltage waveform. In this way, the reference voltage waveform comprises a substantially temperature-independent reference voltage.

Referring to FIG. 2, a graph 200 illustrating how the first voltage waveform $V_n$, represented by the solid line 202, and the second voltage waveform $V_p$, represented by the dashed line 204, vary due to temperature. In the illustrated embodiment, the first voltage waveform $V_n$ has a negative temperature co-efficient because a voltage of the first voltage waveform $V_n$ decreases as the temperature increases. In the illustrated embodiment, the second voltage waveform $V_p$ has a positive temperature co-efficient because a voltage of the second voltage waveform $V_p$ increases as the temperature increases. In other embodiments, the first voltage waveform $V_n$ has a positive temperature co-efficient and the second voltage waveform $V_p$ has a negative temperature co-efficient.

As illustrated in the graph 200, a rate of change for the voltage associated with the first voltage waveform $V_n$ based upon temperature is different than a rate of change for the voltage associated with the second voltage waveform $V_p$ due to a magnitude of the temperature co-efficient associated with the first voltage waveform $V_n$ being different than a magnitude of the temperature co-efficient associated with the second voltage waveform $V_p$. To correct for these varying rates of change, the weighted summation approach is applied to resistive summer 118 in some embodiments to cause the rate of change for the voltage associated with the first voltage waveform $V_n$ to approximate the rate of change for the voltage associated with the second voltage waveform $V_p$. In this way, the reference voltage waveform, which reflects a merging of the first voltage waveform $V_n$ or a buffered version of the first voltage waveform $V_n'$ with the second voltage waveform $V_p$ or a buffered version of the second voltage waveform $V_p'$, comprises a substantially temperature-independent reference voltage.

Figure 3:
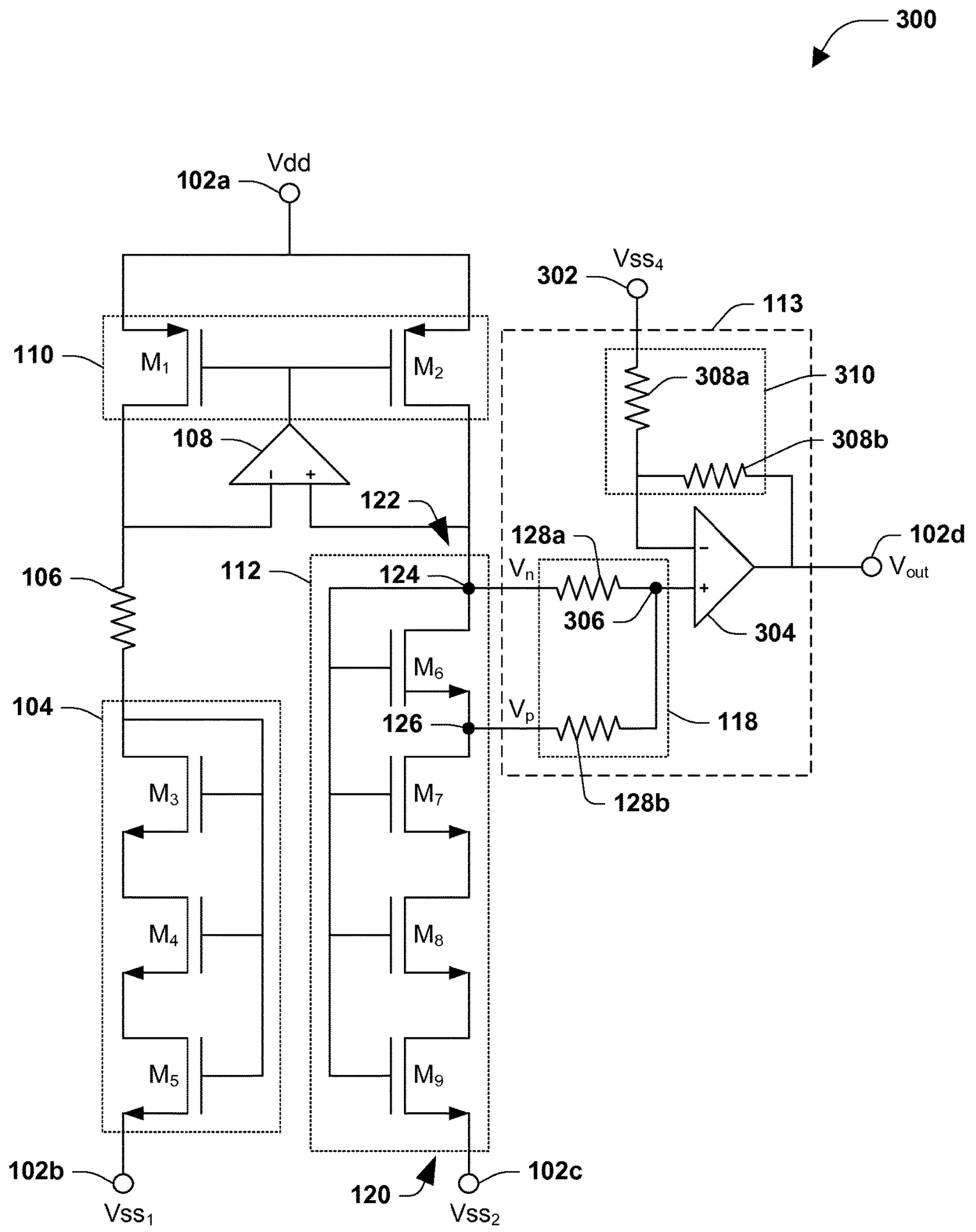
FIG. 3 is voltage-based implementation of a voltage reference circuit, in accordance with some embodiments.

Referring to FIG. 3, a voltage-based implementation of a voltage reference circuit 300 according to some embodiments is provided. The voltage reference circuit 300 is similar to the voltage reference circuit 100 illustrated in FIG. 1 with a few exceptions. For example, a fifth terminal 302 is added to the voltage reference circuit 300 and is coupled to a fifth source $Vss_4$. In some embodiments, the fifth source $Vss_4$ is a same source as at least one of the second source $Vss_1$, the third source $Vss_2$, or the fourth source $Vss_3$. In some embodiments, the fifth source $Vss_4$ is ground.

Another difference is that the resistive summer 118 of the summation circuit is coupled to the first node 124 and the second node 126. For example, a first terminal of the first resistor 128*a* is coupled to the first node 124 and a first terminal of the second resistor 128*b* is coupled to the second node 126. A second terminal of the first resistor 128*a* and a second terminal of the second resistor 128*b* are coupled together to generate a merged waveform at a third node 306.

In some embodiments where the resistive summer 118 is coupled to the first node 124 and the second node 126, the resistive summer 118 is configured to merge the first voltage waveform $V_n$ with the second voltage waveform $V_p$ using one or more of the techniques described with respect to FIG. 1, such as using a summation approach, a weighted summation approach, etc.

In some embodiments, the summation circuit 113 is coupled to the resistive summer 118 via the third node 306 and the merged voltage waveform generated by the resistive summer 118 is applied to a first input of an op-amp 304.

A second input of the op-amp 304 is coupled between resistors 308 of a voltage divider 310 and is configured to receive a scaled version of a reference voltage waveform output from the op-amp 304 and applied to the fourth terminal 102*d*. A first resistor 308*a* of the voltage divider 310 is coupled to the fifth source $Vss_4$ via the fifth terminal 302 and receives a voltage waveform applied by the fifth source $Vss_4$. A second resistor 308*b* of the voltage divider 310 is coupled to an output of the op-amp 304 and is configured to receive the reference voltage waveform. Using the voltage waveform applied by the fifth source $Vss_4$ and the reference voltage waveform, the voltage divider 310 generates the scaled version of a reference voltage waveform.

Figure 4:
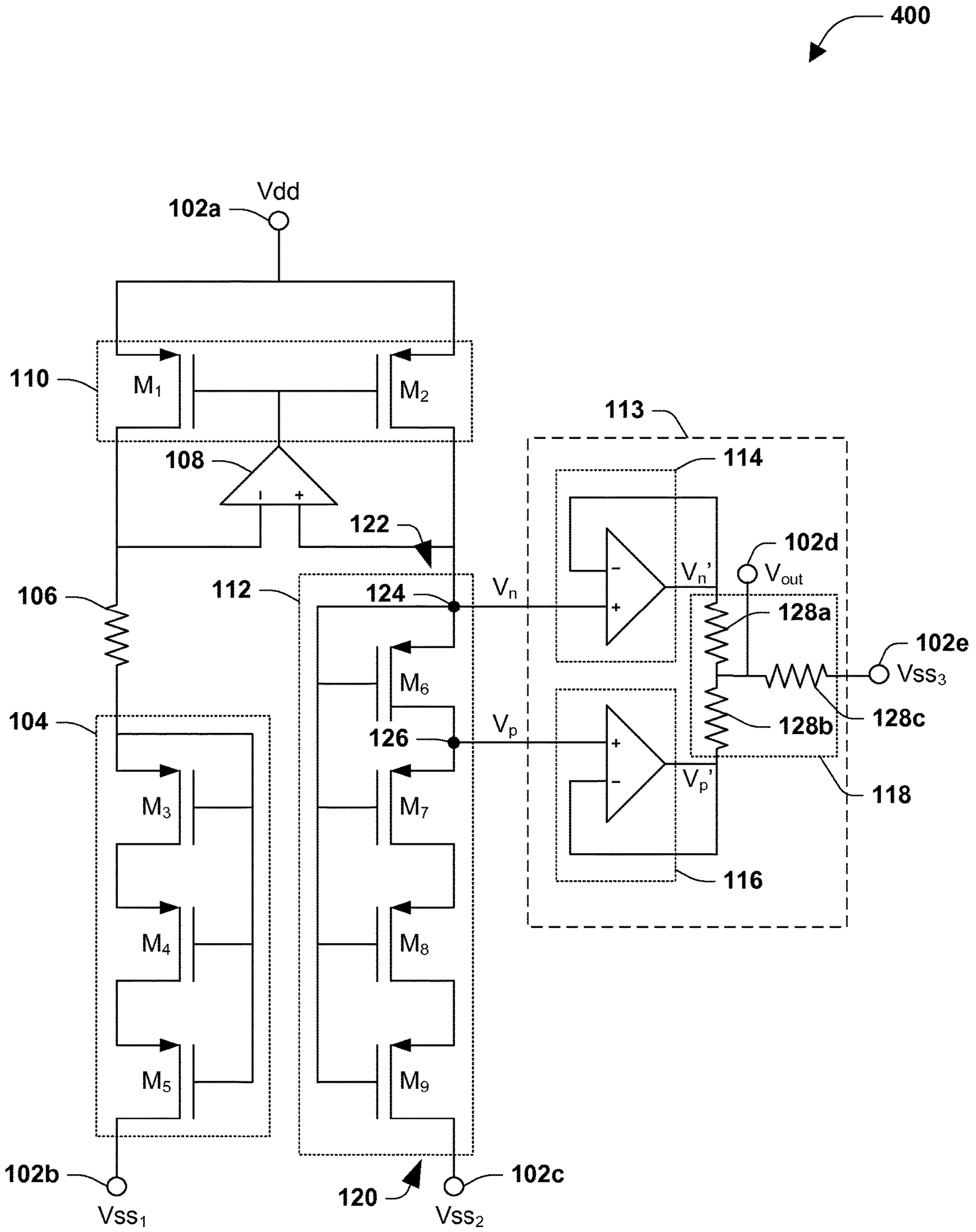
FIG. 4 is voltage-based implementation of a voltage reference circuit, in accordance with some embodiments.

Referring to FIG. 4, a voltage-based implementation of a voltage reference circuit 400 according to some embodiments is provided. The voltage reference circuit 400 is similar to the voltage reference circuit 100 illustrated in FIG. 1 with a few exceptions. For example, the n-channel MOS transistors of the first MOS stack 104 have been replaced with p-channel MOS transistors. As another example, the n-channel MOS transistors of the second MOS stack 112 have been replaced with p-channel MOS transistors. Accordingly, the first node 124 is coupled to a source of the first MOS transistor $M_6$ and the second node 126 is coupled between a drain of the first MOS transistor $M_6$ and a source of the second MOS transistor $M_7$. Further, the third terminal 102*c* is coupled to a drain of the fourth MOS transistor $M_9$ of the second gate stack 112.

Figure 5:
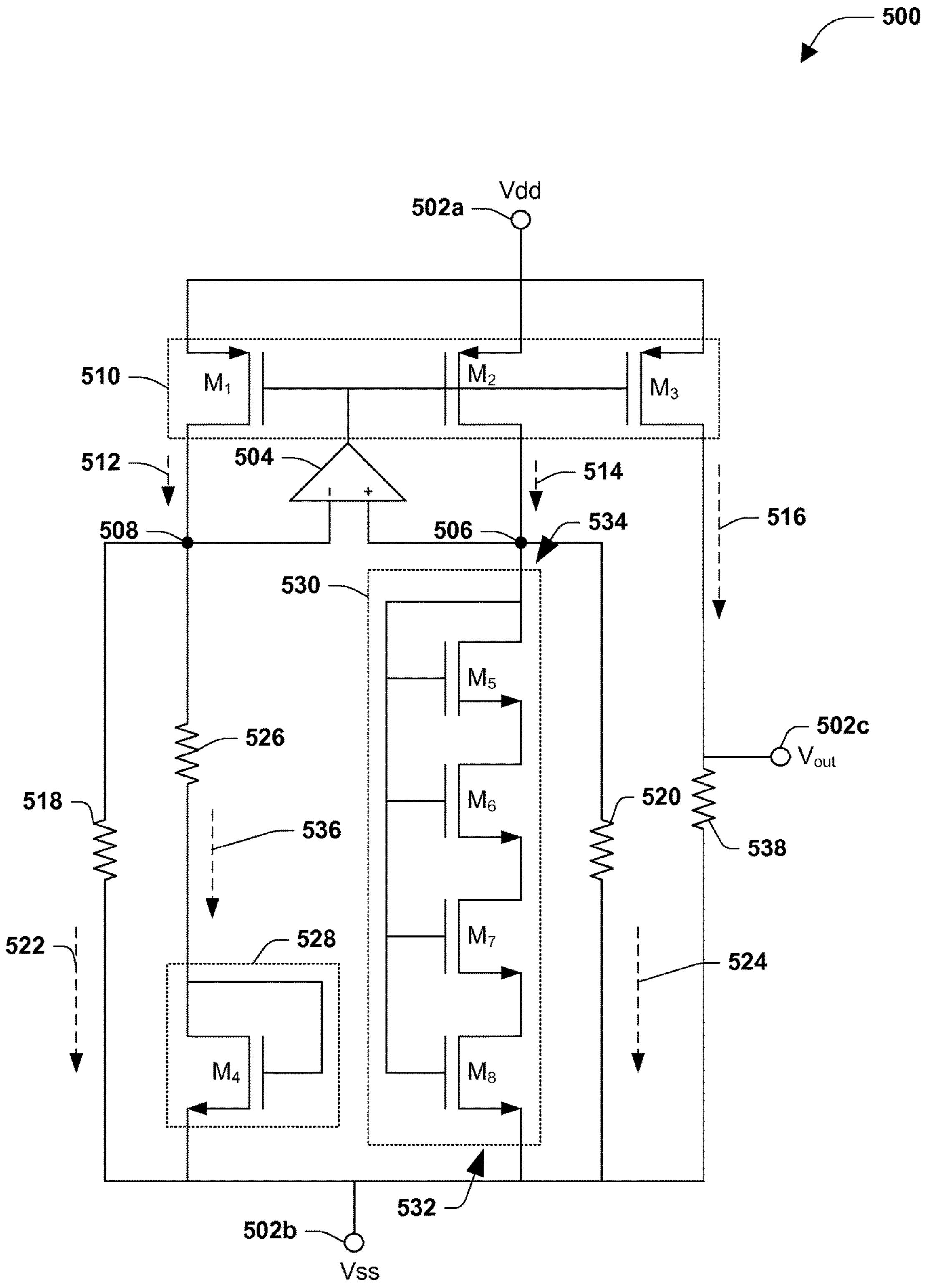
FIG. 5 is current-based implementation of a voltage reference circuit, in accordance with some embodiments.

Referring to FIG. 5, a current-based implementation of a voltage reference circuit 500 according to some embodiments is provided. The voltage reference circuit 500 comprises three terminals 502*a-c*. A first terminal 502*a* is coupled to a first source Vdd, a second terminal 502*b* is coupled to a second source Vss, and a third terminal 502*c* is coupled to a load of the voltage reference circuit 500. In some embodiments, the second source Vss is ground. A reference voltage waveform is output from the third terminal 502*c*.

In some embodiments, the voltage reference circuit 500 comprises an op-amp 504 configured to maintain a voltage at a second node 508, coupled to a first input of the op-amp 504, that is substantially equal to a voltage at a first node 506, coupled to a second input of the op-amp 504. For example, the op-amp 504 applies the voltage at the first node 506 to the second node 508. In some embodiments, the voltage at the first node 506 and at the second node 508 corresponds to a voltage of the first voltage waveform $V_n$ illustrated in FIG. 1.

In some embodiments, the voltage reference circuit 500 comprises a current mirror 510 comprising a plurality of MOS transistors $M_1$-$M_3$. Gates of respective MOS transistors $M_1$-$M_3$ are coupled to an output of the op-amp 504, and the current mirror 510 is configured to maintain a substantially constant output current by selectively activating the first MOS transistor $M_1$, the second MOS transistor $M_2$, and the third MOS transistor $M_3$. Thus, a current at 512 is substantially equal to a current at 514, which is substantially equal to a current at 516.

In some embodiments, the voltage reference circuit 500 comprises a first resistor 518 coupled between the second node 508 and the second terminal 502*b* and a second resistor 520 coupled between the first node 506 and the second terminal 502*b*. A current 518 through the first resistor 518 is a function of a resistance of the first resistor 518 and the voltage of the first voltage waveform $V_n$, which is applied at the second node 508. A current 524 through the second resistor 520 is a function a resistance of the second resistor 520 and the voltage of the first voltage waveform $V_n$, which is applied at the first node 508. In some embodiments, the first resistor 518 and the second resistor 520 have a substantially same resistance and thus the current at 522 is substantially equal to the current at 524. In some embodiments, where the voltage waveform $V_n$ is associated with a negative co-efficient, the current at 522 and 524 has a negative temperature co-efficient. In some embodiments, where the voltage waveform $V_n$ is associated with a positive co-efficient, the current at 522 and 524 has a positive temperature co-efficient.

In some embodiments, a third resistor 526 of the voltage reference circuit 500 is coupled to the second node 508. In some embodiments, the third resistor 526 has a different resistance than the first resistor 518 and the second resistor 520.

In some embodiments, a first MOS stack 528 is coupled between the third resistor 526 and the second terminal 502*b*. In some embodiments, the third resistor 526 and the first MOS stack 528 form a first branch between the second node 508 and the second terminal 502*b*, and the first resistor forms a second branch between the second node 508 and the second terminal 502*b*. In some embodiments, the first branch and the second branch are in parallel.

The first MOS stack 528 comprises one or more MOS transistors, such as MOS transistor $M_4$, and is configured to offset a temperature sensitivity of the voltage at the first node 506 and the second node 508. For example, the first MOS stack 528 causes a voltage at the third resistor 526 to have a temperature co-efficient that is opposite in polarity to the temperature co-efficient of the voltage at the first node 506 and the second node 508. Thus, a current 536 flowing through the third resistor 526 has a temperature co-efficient that is opposite in polarity to the temperature co-efficient of the current 522 through the second resistor 518 and the current 524 through the first resistor 524. For example, if the current 522 and 524 have a negative temperature co-efficient, the current 536 has a positive temperature co-efficient. If the current 522 and 524 have a negative temperature co-efficient, the current 536 has a positive temperature co-efficient.

In some embodiments, the current at 536 is equal to a difference between the voltage of the first voltage waveform $V_n$ and a gate-to-source of the of the MOS transistor $M_4$ divided by the resistance of the third resistor 526 when the MOS transistor $M_4$ is an n-channel MOS transistor. In some embodiments, the current at 536 is equal to a difference between the voltage of the first voltage waveform $V_n$ and a gate-to-drain of the of the MOS transistor $M_4$ divided by the resistance of the third resistor 526 when the MOS transistor $M_4$ is a p-channel MOS transistor.

In some embodiments, the voltage reference circuit 500 comprises a second MOS stack 530 coupled to the first node 506. In some embodiments, the second MOS stack 530 forms a first branch between the first node 506 and the second terminal 532, and the second resistor 520 forms a second branch between the first node 506 and the second terminal 532. In some embodiments, the first branch and the second branch are in parallel.

The second MOS stack 530 comprises two or more MOS transistors, such as MOS transistors $M_5$-$M_8$. For purposes of explanation, a bottom 532 of the second MOS stack 530 refers to a region of the second MOS stack 530 nearest the second terminal 502*b* and a top 534 of the second MOS stack 530 refers to a region of second MOS stack 530 nearest the first node 506. The second MOS stack 530 is configured to influence the voltage at the first node 506 and thus also influences the voltage at the second node 508.

The MOS transistor $M_4$ of the first MOS stack 528 and the MOS transistors $M_5$-$M_8$ of the second MOS stack 530 have a substantially same threshold voltage, although the specific voltage threshold that is selected may be application specific and thus may vary by application. Further, the MOS transistors $M_5$-$M_8$ are configured to operate in a sub-threshold region, where the sub-threshold region corresponds to a spectrum of voltages below the voltage threshold for the MOS transistors $M_5$-$M_8$.

In some embodiments, the first transistor $M_5$ disposed nearest the top 534 of the MOS stack 530 has a substantially same channel width as the MOS transistor $M_4$ of the first gate stack 528 and has a substantially same channel length as the MOS transistor $M_4$. Thus, the difference between the voltage of the first voltage waveform $V_n$ and the gate-to-source of the of the MOS transistor $M_4$ is equal to a voltage of the second voltage waveform $V_p$ when the MOS transistor $M_4$ is an n-channel MOS transistor. When the MOS transistor $M_4$ is an p-channel MOS transistor, the difference between the voltage of the first voltage waveform $V_n$ and a gate-to-drain of the of the MOS transistor $M_4$ is equal to a voltage of the second voltage waveform $V_p$.

The current at 516 is generated by the current mirror 510 based upon the current 522 through the first resistor 518 and the current 536 through the third resistor 526. In some embodiment, the current at 516 is equal to a sum of the current at 522 and the current at 536. In some embodiments, a fourth resistor 538 is coupled to the third terminal 502*c* wherein the reference voltage waveform is output, and thus a voltage of the reference voltage waveform is equal to the sum of the current at 522 and the current at 536, divided by a resistance of a fourth resistor 538. In some embodiments, the current at 522 is a function of the voltage of the first voltage waveform $V_n$ and the current at 536 is a function of the voltage of the second voltage waveform $V_p$, and thus the current-based implementation of a voltage reference circuit 500 is substantially equivalent to the voltage-based implementation of a voltage reference circuit 100 illustrated in FIG. 1, according to some embodiments.

The foregoing voltage-based implementations and current-based implementations of a voltage reference circuit provide numerous benefits. In some embodiments, MOS transistors having a substantially same voltage threshold are used to generate the voltage or current waveform having the negative temperature co-efficient and the voltage or current waveform having the positive temperature co-efficient. Accordingly, process variation is reduced over voltage reference circuits where devices having different voltage thresholds generate the voltage or current waveform having the negative temperature co-efficient and the voltage or current waveform having the positive temperature co-efficient because tracking and correlation of devices having different voltage threshold is challenging to maintain during process manufacturing. Moreover, in some embodiments, the voltage reference circuit is operated in a sub-threshold region and thus power consumption can be low. In some embodiments, the voltage reference circuit operates with a supply voltage between 0.4 Volts and 0.7 Volts. In some embodiments, this low power consumption facilitates using the voltage reference circuit in internet-of-things applications or bio-medical body implantable devices where low power consumption is an important consideration.

According to some embodiments, a voltage reference circuit is provided. The voltage reference circuit comprises a metal-oxide semiconductor (MOS) stack comprising a first MOS transistor having a first source/drain region and a second source/drain region and a second MOS transistor having a first source/drain region and a second source/drain region. A first voltage waveform is generated at a first node coupled to the first source/drain region of the first MOS transistor and a second voltage waveform is generated at a second node coupled between the second source/drain region of the first MOS transistor and the first source/drain region of the second MOS transistor. The voltage reference circuit also comprises a summation circuit configured to merge the first voltage waveform with the second voltage waveform to generate a reference voltage waveform.

According to some embodiments, a voltage reference circuit is provided. The voltage reference circuit comprises a metal-oxide semiconductor (MOS) stack comprising a plurality of MOS transistors and influences a first voltage at a first node. The voltage reference circuit also comprises an operation amplifier configured to apply the first voltage to a second node and a first resistor coupled to the second node. A first current flows through the first resistor when the first voltage is applied to the second node. The voltage reference circuit also comprises a second resistor coupled to the second node. A second current flows through the second resistor when the first voltage is applied to the second node. The voltage reference circuit also comprises a MOS transistor coupled to the second resistor and configured to offset a temperature sensitivity of the first voltage and a third resistor coupled to a terminal wherein a reference voltage waveform is output. The voltage reference circuit also comprises a current mirror configured to generate a third current based upon the first current and the second current. The third current flows through the third resistor to generate the reference voltage waveform.

According to some embodiments, a voltage reference circuit is provided. The voltage reference circuit comprises a metal-oxide semiconductor (MOS) stack comprising a first MOS transistor having a first source/drain region and a second source/drain region and a second MOS transistor having a first source/drain region and a second source/drain region. A first voltage waveform having a first temperature co-efficient is generated at a first node coupled to the first source/drain region of the first MOS transistor. A second voltage waveform having a second temperature co-efficient is generated at a second node coupled between the second source/drain region of the first MOS transistor and the first source/drain region of the second MOS transistor. The voltage reference circuit also comprises a summation circuit configured to merge the first voltage waveform with the second voltage waveform to generate a reference voltage waveform. The second temperature co-efficient substantially cancels the first temperature co-efficient during the merge.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A voltage reference circuit, comprising:

a metal-oxide semiconductor (MOS) stack comprising:

a first MOS transistor having a first source/drain region, a second source/drain region, and a gate; and a second MOS transistor having a first source/drain region, a second source/drain region, and a gate, wherein:

a first voltage waveform is generated at a first node to which the first source/drain region of the first MOS transistor, the gate of the first MOS transistor, and the gate of the second MOS transistor are coupled, and a second voltage waveform is generated at a second node coupled between the second source/drain region of the first MOS transistor and the first source/drain region of the second MOS transistor; and a summation circuit configured to merge the first voltage waveform with the second voltage waveform to generate a reference voltage waveform.

2. The voltage reference circuit of claim 1, wherein the first voltage waveform has a negative temperature co-efficient and the second voltage waveform has a positive temperature co-efficient.

3. The voltage reference circuit of claim 1, wherein the first voltage waveform has a positive temperature co-efficient and the second voltage waveform has a negative temperature co-efficient.

4. The voltage reference circuit of claim 1, wherein the summation circuit is configured to apply a first weight to the first voltage waveform and to apply a second weight to the second voltage waveform prior to the merge, the second weight different than the first weight.

5. The voltage reference circuit of claim 1, wherein the first MOS transistor and the second MOS transistor have a substantially same voltage threshold.

6. The voltage reference circuit of claim 1, wherein the first MOS transistor has a first channel width and the second MOS transistor has a second channel width, the first channel width different than the second channel width.

7. The voltage reference circuit of claim 1, wherein:

the first source/drain region of the first MOS transistor corresponds to a drain region;

the second source/drain region of the first MOS transistor corresponds to a source region;

the first source/drain region of the second MOS transistor corresponds to a drain region; and the second source/drain region of the second MOS transistor corresponds to a source region.

8. The voltage reference circuit of claim 1, wherein the summation circuit comprises a resistive summer.

9. The voltage reference circuit of claim 8, wherein the summation circuit comprises:

a first buffer coupled between the first node and the resistive summer; and a second buffer coupled between the second node and the resistive summer.

10. The voltage reference circuit of claim 9, wherein at least one of the first buffer or the second buffer comprises an operational amplifier.

11. The voltage reference circuit of claim 8, wherein a first input of the resistive summer is coupled to the first node and a second input of the resistive summer is coupled to the second node.

12. The voltage reference circuit of claim 11, wherein an output of the resistive summer is coupled to an operational amplifier configured to generate the reference voltage waveform.

13. The voltage reference circuit of claim 1, wherein the summation circuit comprises a first operational amplifier coupled to the first node and the voltage reference circuit comprises a second operational amplifier, different than the first operational amplifier, coupled to the first node.

14. A voltage reference circuit, comprising:

a metal-oxide semiconductor (MOS) stack comprising:

a first MOS transistor having a first source/drain region and a second source/drain region; and a second MOS transistor having a first source/drain region and a second source/drain region, wherein:

a first voltage waveform having a first temperature co-efficient is generated at a first node coupled to the first source/drain region of the first MOS transistor, and a second voltage waveform having a second temperature co-efficient is generated at a second node coupled between the second source/drain region of the first MOS transistor and the first source/drain region of the second MOS transistor; and a summation circuit configured to merge the first voltage waveform with the second voltage waveform to generate a reference voltage waveform, wherein:

the summation circuit comprises a first resistor, a second resistor, and a third resistor commonly coupled to a third node, and the second temperature co-efficient substantially cancels the first temperature co-efficient during the merge.

15. A voltage reference circuit, comprising:

an operational amplifier;

a resistor having a first terminal coupled to a first input of the operational amplifier;

a first metal-oxide semiconductor (MOS) stack coupled to the resistor, wherein:

a source/drain region of a first MOS transistor of the first MOS stack is coupled a second terminal of the resistor, and a gate of the first MOS transistor is coupled the second terminal of the resistor;

a second MOS stack comprising:

a second MOS transistor having a first source/drain region and a second source/drain region; and a third MOS transistor having a first source/drain region and a second source/drain region, wherein:

a first voltage waveform is generated at a first node coupled to the first source/drain region of the second MOS transistor and coupled to a second input of the operational amplifier, and a second voltage waveform is generated at a second node coupled between the second source/drain region of the second MOS transistor and the first source/drain region of the third MOS transistor; and a summation circuit configured to merge the first voltage waveform with the second voltage waveform to generate a reference voltage waveform.

16. The voltage reference circuit of claim 15, comprising:

a fourth MOS transistor, wherein:

a gate of the fourth MOS transistor is coupled to an output of the operational amplifier, and a source/drain region of the fourth MOS transistor is coupled to the first terminal of the resistor and the first input of the operational amplifier.

17. The voltage reference circuit of claim 15, comprising:

a fourth MOS transistor, wherein:

a gate of the fourth MOS transistor is coupled to an output of the operational amplifier, and a source/drain region of the fourth MOS transistor is coupled to the first node.

18. The voltage reference circuit of claim 15, comprising:

a fourth MOS transistor, wherein:

a gate of the fourth MOS transistor is coupled to an output of the operational amplifier, and a first source/drain region of the fourth MOS transistor is coupled to the first terminal of the resistor and the first input of the operational amplifier; and a fifth MOS transistor, wherein:

a gate of the fifth MOS transistor is coupled to the output of the operational amplifier, and a first source/drain region of the fifth MOS transistor is coupled to the first node.

19. The voltage reference circuit of claim 18, wherein a second source/drain region of the fourth MOS transistor and a second source/drain region of the fifth MOS transistor are coupled to a common node.

20. The voltage reference circuit of claim 15, wherein the summation circuit comprises:

a first buffer coupled between the first node and a resistive summer; and a second buffer coupled between the second node and the resistive summer.

* * * * *